(12) United States Patent
McCrink et al.

(10) Patent No.: US 7,540,402 B2
(45) Date of Patent: *Jun. 2, 2009

(54) METHOD FOR CONTROLLING WELD METAL MICROSTRUCTURE USING LOCALIZED CONTROLLED COOLING OF SEAM-WELDED JOINTS

(75) Inventors: Edward J. McCrink, Escondido, CA (US); Daniel S. Codd, Escondido, CA (US)

(73) Assignee: KVA, Inc., Rancho Santa Fe, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/008,367

(22) Filed: Jan. 10, 2008

(65) Prior Publication Data

US 2008/0203139 A1      Aug. 28, 2008

Related U.S. Application Data

(63) Continuation-in-part of application No. 11/542,970, filed on Oct. 4, 2006, which is a continuation-in-part of application No. 11/519,331, filed on Sep. 11, 2006, now Pat. No. 7,475,478, which is a continuation-in-part of application No. 10/519,910, filed as application No. PCT/US02/20888 on Jul. 1, 2002, now abandoned.

(60) Provisional application No. 60/879,861, filed on Jan. 10, 2007, provisional application No. 60/301,970, filed on Jun. 29, 2001.

(51) Int. Cl.
*B23K 31/02* (2006.01)
*C21D 9/50* (2006.01)
*B23K 101/04* (2006.01)

(52) U.S. Cl. .................. 228/231; 148/590; 148/639

(58) Field of Classification Search .................. None
See application file for complete search history.

(56) References Cited

U.S. PATENT DOCUMENTS 2,262,693 A       11/1941     Mikhalapov .................. 219/10

(Continued)

FOREIGN PATENT DOCUMENTS

EP            1 143 024          10/2001

(Continued)

OTHER PUBLICATIONS

D.S. Codd—Seam welding and cooling-control heat-treatment of martensitic stainless steel, SAE Technical Paper Series: Welding and Joining and Fastening (SP-2196), 2008-01-1132, 11 pages.*

(Continued)

*Primary Examiner*—Roy King
*Assistant Examiner*—Mark L Shevin
(74) *Attorney, Agent, or Firm*—Russo & Duckworth, LLP

(57) ABSTRACT

The present invention provides a method for welding and heat-treating seam-welded constructions of hardenable steel and ferrous alloys with reduced weld-zone hardness and improved weld-zone ductility and toughness. This method consists of controlling the cooling rate of the seam weld with a secondary heat source, applied after the weld cools below the materials upper critical temperature ($A_{C3}$), but prior to the weld cooling to ambient temperature. This invention is particularly suited to the production of high strength hardenable alloy seam-welded pipe and tubing.

20 Claims, 10 Drawing Sheets

Four HAZ regions:

1   γ + ferrite ⟶ martensite + ferrite
2   Coarse-grained γ ⟶ martensite
3   Fine-grained γ ⟶ martensite
4   Overtempered base metal

U.S. PATENT DOCUMENTS

| | | | |
|---|---|---|---|
| 3,046,167 A | 7/1962 | Waxweiler et al. | 148/135 |
| 3,242,299 A | 3/1966 | Laughlin et al. | 219/8.5 |
| 3,767,882 A * | 10/1973 | Garnier | 219/614 |
| 3,796,849 A | 3/1974 | Cuvelier | 219/10.41 |
| 3,807,715 A * | 4/1974 | Nelson et al. | 266/261 |
| 4,062,705 A | 12/1977 | Gondo | 148/127 |
| 4,072,035 A | 2/1978 | Ziemek et al. | 72/209 |
| 4,188,419 A | 2/1980 | Detert | 427/287 |
| 4,256,486 A | 3/1981 | Yoshioka et al. | 75/125 |
| 4,402,769 A | 9/1983 | Beigay et al. | 148/12 EA |
| 4,413,039 A | 11/1983 | Higuchi | 428/643 |
| 4,461,679 A | 7/1984 | Higuchi | 204/27 |
| 4,857,697 A * | 8/1989 | Melville | 219/121.63 |
| 4,885,215 A | 12/1989 | Yoshioka et al. | 428/632 |
| 4,966,751 A | 10/1990 | Kaede | 420/34 |
| 4,975,128 A | 12/1990 | Schmitz | 148/127 |
| 5,323,265 A | 6/1994 | Fujie | 359/507 |
| 5,370,751 A | 12/1994 | von Hagen | 148/330 |
| 5,374,322 A * | 12/1994 | Okada et al. | 148/663 |
| 5,485,948 A | 1/1996 | McCrink | 228/126 |
| 5,558,317 A | 9/1996 | Nels | 267/156 |
| 5,770,832 A * | 6/1998 | Carnes et al. | 219/109 |
| 5,820,703 A * | 10/1998 | Suzuki et al. | 148/593 |
| 5,840,136 A * | 11/1998 | Maruki et al. | 148/664 |
| 5,849,116 A | 12/1998 | Miyasaka et al. | 148/592 |
| 5,871,140 A | 2/1999 | McCrink | 228/132 |
| 5,938,865 A | 8/1999 | Kondo et al. | 148/593 |
| 5,939,018 A | 8/1999 | Ohtsubo et al. | 420/34 |
| 6,149,743 A * | 11/2000 | Lund et al. | 148/579 |
| 6,235,407 B1 | 5/2001 | Ogata | 428/626 |
| 6,410,165 B1 | 6/2002 | Warren | 428/680 |
| 6,639,173 B1 * | 10/2003 | Murphy | 219/121.14 |
| 6,645,318 B2 | 11/2003 | Takahashi | 148/325 |
| 6,673,472 B2 | 1/2004 | Maki | 428/653 |
| 6,718,932 B1 | 4/2004 | Cecur | 123/188.3 |
| 6,730,407 B2 | 5/2004 | Mori | 428/425.8 |
| 6,786,981 B2 | 9/2004 | Yazawa | 148/325 |
| 6,814,820 B2 | 11/2004 | Ozbaysal | 148/671 |
| 6,905,041 B1 | 6/2005 | Taketsu | 220/562 |
| 6,935,529 B2 | 8/2005 | Ishikawa | 220/562 |
| 7,157,672 B2 | 1/2007 | Gandy | 219/612 |
| 2001/0030004 A1 | 10/2001 | Kushda | 148/325 |
| 2002/0005394 A1 | 1/2002 | Kelly et al. | 219/72 |
| 2002/0109024 A1 | 8/2002 | Molnar | 239/585.1 |
| 2003/0025341 A1 | 2/2003 | Kollaritsch | 293/102 |
| 2003/0138342 A1 | 7/2003 | Hirasawa | 420/38 |
| 2004/0040944 A1 | 3/2004 | Offer | 219/128 |
| 2004/0089655 A1 | 5/2004 | Matsen et al. | 219/602 |
| 2004/0234715 A1 | 11/2004 | Gandy | 428/36.9 |
| 2004/0262930 A1 | 12/2004 | Cumming | 293/120 |
| 2006/0042729 A1 | 3/2006 | Kottilingam et al. | 148/675 |
| 2006/0113011 A1 | 6/2006 | Tanida | 148/592 |
| 2006/0130940 A1 | 6/2006 | Kollaritsch | 148/518 |
| 2006/0137781 A1 | 6/2006 | Kusinski et al. | 148/664 |
| 2006/0237103 A1 | 10/2006 | Tabuchi et al. | 148/330 |

FOREIGN PATENT DOCUMENTS

| | | | |
|---|---|---|---|
| GB | 1 343 387 | | 8/1972 |
| JP | 56 47214 | | 4/1981 |
| JP | 04-191319 | | 9/1992 |
| JP | 9 327721 | | 12/1997 |
| JP | 2002137086 | | 5/2002 |
| JP | 2002301577 | | 10/2002 |
| WO | WO 96/27456 | * | 9/1996 |
| WO | WO 99/47287 | | 9/1999 |
| WO | WO 00/37700 | | 6/2000 |

OTHER PUBLICATIONS

KVA Marketing Brochure, 4 pages.*
G.F. Vander Voort et al, Metallography and microstructures of stainless steels and maraging steels, Metallography and Microstructures, vol. 9, ASM Handbook, ASM International, 2004, 20 pages.*
J. Douthett, Heat treating of stainless steels, vol. 4, ASM Handbook, ASM International, 1998, 23 pages.*
Martensitic Stainless Steel, Heat Treater's Guide: Practices and Procedures for Iron and Steel, ASM International, 1995, 1 page.*
T.G. Gooch. Welding metallurgy of stainless steel. pp. 77-78; J. Gordon Parr. An introduction to Stainless Steel. 1965. Allegheny Ludlum Steel Corp. (Stainless Steel Handbook) Claud Bagger, et al. Induction heat treatment of laser welds. vol. 15, No. 4. Nov. 2003. N. Irvine Saz. Hawley's Condensed Chemical Dictionary. 11th Edition. Naoshi Ayukawa, et al. Development of weldable martensitic stainless steel line pipe by HF-ERW process. Stainless Steel World 1999.

* cited by examiner

Four HAZ regions:

1. γ + ferrite ⟶ martensite + ferrite
2. Coarse-grained γ ⟶ martensite
3. Fine-grained γ ⟶ martensite
4. Overtempered base metal ID# METHOD FOR CONTROLLING WELD
METAL MICROSTRUCTURE USING
LOCALIZED CONTROLLED COOLING OF
SEAM-WELDED JOINTS

RELATED APPLICATIONS

This application is a continuation-in-part of U.S. Provisional Application Ser. No. 60/879,861, filed Jan. 10, 2007 and a continuation-in-part application of U.S. Ser. No. 11/542,970, filed Oct. 4, 2006, which is in turn a continuation-in-part application of U.S. application Ser. No. 11/519,331, filed Sep. 11, 2006, now U.S. Pat. 7,475,478, which is in turn a continuation-in-part application of U.S. application Ser. No. 10/519,910, field Dec. 30, 2004, now abandoned, which is in turn, a National Phase application of International Application Serial No. PCT/US02/20888, filed Jul. 1, 2002, which in turn, claims priority to U.S. Provisional Application Ser. No. 60/301,970, filed Jun. 29, 2001. Each of these applications is incorporated in their entirety by reference.

BACKGROUND OF THE INVENTION

This invention relates to welding and heat-treatment apparatus and methods. More particularly, this invention is directed to methods for manufacturing seam welds with reduced weld-zone hardness and improved weld-zone ductility and toughness. This invention is particularly useful in the production of high strength seam-welded pipe and tubing.

Ubiquitously used throughout all modern industries, welded ferrous alloys have become the de facto standard in structural component design. Current trends in many fields have focused interest away from low-strength common mild steels towards high and ultra high strength steels. These alloys are formulated to have greater tensile strengths than low-carbon steels, due to the specific microstructures that are produced during thermomechanical processing. Some examples of high strength steels currently in use in the automotive industry include dual-phase, martensitic, boron-treated and transformation-induced plasticity steels. Other high-strength alloys include air, oil and water hardenable carbon steels and martensitic stainless steels. All of these are designed so that some volume percentage of martensite forms in the materials microstructure. The resulting distorted body-centered cubic (BCC) or body-centered tetragonal (BCT) martensitic crystal structure formed in the hardened condition imparts high strength to the metal. These materials are ideally suited for structural components and assemblies, satisfying the requirements of high strength and toughness.

Unfortunately, the tendency to form martensite, and relative high hardenability, of these and other ultra high-strength alloys poses difficulties in welding. The thermal cycle of heating and rapid cooling, which occurs within the confined heat-affected-zone (HAZ) during welding, is equivalent to a rapid quenching cycle. The chemistry of high strength steel grades results in a complete transformation from ferrite to austenite ($\gamma$) at high temperature, followed by a subsequent change to the hard martensite phase upon rapid cooling. In seam welding applications, the natural weld cooling rate can be as high as 1000° C./s, sufficiently fast enough to produce a martensitic structure in most high strength, high-carbon alloys. (See FIGS. 1 and 2). The resulting martensitic structure produced is extremely brittle in the untempered condition. Cracking of the weld zone can occur for several reasons, including:

Hydrogen induced cold-cracking, due to trapped hydrogen in the distorted BCC martensite crystal structure. Tensile stress applied to the weld increases the risk of cracking.

Thermal induced stresses, due to the heat input during welding, degree of joint restraint, and the volume change upon martensite transformation.

Most forms of cracking result from shrinkage strains that occur as the weld metal cools to ambient temperature. If the contraction is restricted, the strains will induce residual tensile stresses that cause cracking. There are two opposing forces: the stresses induced by the shrinkage of the metal, and the surrounding rigidity of the base material. Large weld sizes, high heat input and deep penetrating welding procedures increase the shrinkage strains. The stresses induced by these strains will increase when higher strength filler metals and base materials are involved. With higher yield strengths, higher residual stresses will be present.

These problems occur when welding certain steels regardless of their prior condition, whether annealed, hardened, or hardened-and-tempered. They can occur with all types of welding, including GTAW, GMAW, HF, laser-beam, friction, resistance and electron-beam. In all cases, the fusion zone and high-temperature HAZ will be in the "as-quenched" condition after welding. Any mechanical straining after welding (i.e. continuous tube mill forming and straightening) may cause the martensitic HAZ to crack.

Additionally, many assemblies, once welded and fabricated from these alloys, cannot be subjected to a final homogenizing solution heat treatment cycle. Examples include assemblies fabricated from pre-hardened or special thermo-mechanically processed base metals, such as dual phase steels, whereby the heat cycle would destroy the unique microstructure of the alloy. Also, placing the entire welded assembly into a furnace to be post-weld stress relieved may not be physically feasible, as the case of automotive structural beams welded to the massive vehicle body structure. Some assemblies would not tolerate an entire-structure post-weld thermal treatment, as is the case for welded automotive fuel tank assemblies with thermoplastic interior components. In any case, great benefits could be realized if the as-welded brittleness could be reduced. Ductility and toughness of the finished weld would be greatly improved in the case of welded structures put into service without any further thermal treatment.

Typical methods of controlling weld and HAZ hardness include off-line secondary post-weld heat treatments (PWHT) such as process annealing and tempering of the weld by heating the entire part. Pre-heating methods can be used to slow the rate of cooling, thereby reducing the percentage of the martensitic phase present. (See FIG. 3). The latent heat in the workpiece reduces the cooling rate of the welded seam, and cracking is thus inhibited. In the past, pre- and post-weld heat treatments have been performed in large batch heat treatment furnaces to ramp and hold a group of components at a suitable heat treatment temperature. Drawbacks to the use of batch heat treatment processes include long heat treatment times, due in part to the mass of the large batch furnace and the mass of the components being heat treated. Additionally, long queuing times occur while batches are assembled as individual components are welded. Standard post-weld thermal treatments, such as stress relieving or tempering, involve relatively long hold times at prescribed temperatures, along with slow furnace cooling. To compound matters more, a global pre-or-post-weld heat treatment can destroy the desired microstructure of the base metal. Parts made from dual phase or martensitic steels, for example, may suffer an overall loss in mechanical properties if the entire part is subjected to a thermal treatment with other-than optimal heating times and quench rates.

Another method to reduce weld hardness is to add filler material, whereby the final metallurgy is modified in such a way that the percentage of hard and brittle components such as martensite is reduced. However, some seam welding processes (such as laser or resistance) are difficult to use with filler metals. Additionally, costly filler metals are selected so as to not harden upon cooling, and thereby provide lower strength weldments. This necessitates an even larger weld to be used to meet the required joint strength.

In seam-welded tube production, the traditional approach to solve welding difficulties inherent of high-strength alloys is to modify the material's chemical composition. Typically, low-carbon versions of air-hardenable alloys are developed so that the seam-weld does not become fully martensitic and will not crack during tube production. An example of this is U.S. Pat. No. 7,157,672, Method of manufacturing stainless steel pipe for use in piping systems, which details the use of low-carbon dual-phase 0.08% C max stainless material in conventional tube manufacturing processes. Similarly, a modified composition is used to produce pipe in the following article: *Development of weldable martensitic stainless steel line pipe by HF-ERW process,* N. Ayukawa, et al., Stainless Steel World 1999 Conference Proceedings, 1999. In modifying the chemical composition, there is a tradeoff of between the ease of welding and the material's hardenability and maximum mechanical properties.

To work around the welding difficulties without changing the material's composition, tubing can be drawn or extruded. This "seamless" air-hardenable tubing fills the need for high-strength, air hardenable alloy tubing and pipe, but the production is very costly and time consuming. Additionally, longer lengths are not available due to the nature of the drawing process.

Conventional processes such as batch pre-heating and PWHT do not lend themselves to cost-efficient, high-quality, high volume production. Unfortunately, these methods are not cost, time, nor energy efficient for high production levels associated with modern manufacturing methods. The ideal solution would allow for either autogenous welds (i.e. no filler metal used) or the use of matching strength filler metals, of similar chemical compositions to the base metals being welded that are capable of hardening to a high strength joint.

The present inventors describe various methods for increasing weld and HAZ ductility within U.S. Pat. No. 7,232,053 issued Jun. 19, 2007; U.S. Provisional Application Ser. No. 60/879,861, filed Jan. 10, 2007; U.S. application Ser. No. 11/542,970, filed Oct. 4, 2006; U.S. application Ser. No. 11/526,258 filed Sep. 22, 2006; U.S. application Ser. No. 11/519,331, filed Sep. 11, 2006; U.S. application Ser. No. 10/519,910, filed Dec. 30, 2004; International Application Serial No. PCT/US02/20888 filed Jul. 1, 2002; U.S. Provisional Application Ser. No. 60/301,970, filed Jun. 29, 2001. Each of these references are incorporated by reference in their entirety herein. Unfortunately, even these methods have disadvantages.

Thus it would be desirable from a production point of view to provide a heat treatment during production in order to improve the mechanical properties of seam-welded joints. Preferably, a simple in-line weld cooling-control and PWHT method could be used to appreciably increase weld and HAZ ductility without increasing process time.

SUMMARY OF THE INVENTION

Briefly, in accordance with the invention, we provide improved methods of forming steel structures including but not limited to welded tube structures. In the broadest of terms, the present invention is directed to controlling the cooling rate of welds formed using hardenable ferrous alloys. To this end, the method of forming a steel structure includes providing first and second surfaces of hardenable ferrous alloys which are to be welded together. The first and second surfaces of hardenable ferrous alloys are welded together by applying a heat source, preferably in the form of a traditional welding apparatus so as to bring the first and second surfaces to sufficiently high temperatures so as to melt and form a weld. A second heat source is provided to immediately apply heat to the weld zone prior to the weld cooling below the martensitic finish temperature ($M_F$) for the hardenable ferrous alloys. The second heat source preferably provides "localized" heat in the form of a propane or oxyacetylene torch, resistance, electric arc, lasers, conductive, radiative, convective or high-frequency induction so as to provide heat to the weld zone. However, the second heat source does not provide heat to the entire component such as would be provided by traditional furnaces or ovens typically used for heat treating operations such as annealing. The second heat source provides sufficient heat at a sufficiently high temperature and for a sufficiently long period of time so as to reduce the hardness of the weld. After application of the second heat source, the weld is allowed to cool to the ambient temperature, preferably by traditional air cooling.

In a first embodiment, the first and second surfaces of hardenable ferrous alloys are welded together and the secondary heat source applies heat immediately prior to the weld zone temperature dropping below the martensitic start ($M_S$) temperature. Heat from the secondary heat source may cause the temperature to rise above the lower critical temperature ($A_{C1}$) for the ferrous alloy. Alternatively, the secondary heat source may introduce sufficient heat to allow for slow cooling, but not increase the weld temperature back above the lower critical temperature ($A_{C1}$) for the ferrous alloy. Whether the weld temperature rises above the lower critical temperature or not, preferably the weld temperature does not rise above the upper critical temperature ($A_{C3}$).

In an alternative embodiment of the present invention, the secondary heat source introduces localized heat to the weld immediately after welding and after the weld zone temperature drops below the martensitic start ($M_S$) temperature for the ferrous alloy, but not below the martensitic finish ($M_F$) temperature for the ferrous alloy. The application of heat from the secondary heat source may cause the temperature of the weld zone to rise again above the lower critical temperature ($A_{C1}$) for the ferrous alloy, or the temperature of the second heat source may not cause the weld zone temperature to rise above the lower critical temperature ($A_{C1}$) of the ferrous alloy. Regardless, sufficient heat from the secondary heat source is applied for a sufficiently long time period so as to reduce the hardness of the weld.

A wide variety of "hardenable ferrous alloys" may be employed in the practice of the present invention including those steels and alloys that are considered air hardenable. Because different alloys will possess different lower critical temperatures, martensitic start temperatures, martensitic finish temperatures and because weld characteristics will vary depending on the weld design, the application of heat from the secondary heat source and the time period for its application will vary. The method of forming a steel structure of the present invention is believed to have particular application to hardenable martensitic stainless steels, particularly those of type 410, 420 or 440.

The method of forming steel structures of the present invention is also believed to have particular application for forming tube structures in which rollers form a steel strip into a tube shape. Opposing edges of the roll are welded together and the secondary heat source applies heat prior to the weld dropping below the martensitic finish temperature. Again, the secondary heat source provides sufficient heat for a sufficiently long time period as to reduce the hardness of the weld.

Accordingly, it is an object of the present invention to provide an improved method for forming welded steel structures of hardenable ferrous alloys.

It is an additional object of the invention to provide an improved method for forming steel structures wherein heat treatment can be conducted during initial production in order to improve the mechanical properties of seam welded joints.

It is still an additional object of the present invention to provide an in-line weld cooling control system which will increase weld and HAZ ductility without increasing processing time.

It is still another object of the present invention to provide a method for forming steel structures which is inexpensive and relatively simple to implement.

These and other further objects and advantages of the invention will be apparent to those skilled in the art from the following detailed description taken in conjunction with the drawings.

DETAILED DESCRIPTION OF THE INVENTION

Figure 1:
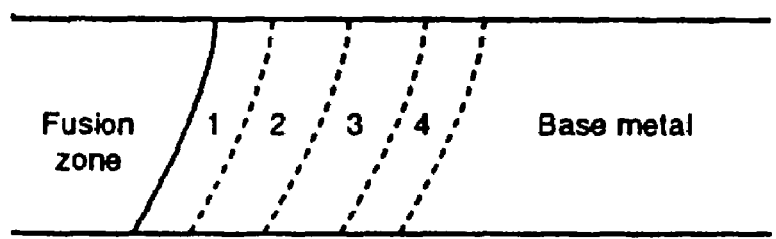
FIG. 1 is a chart illustrating the four distinct microstructure regions observed in the heat-affected zone (HAZ) of air-hardenable steels after welding.
Figure 2:
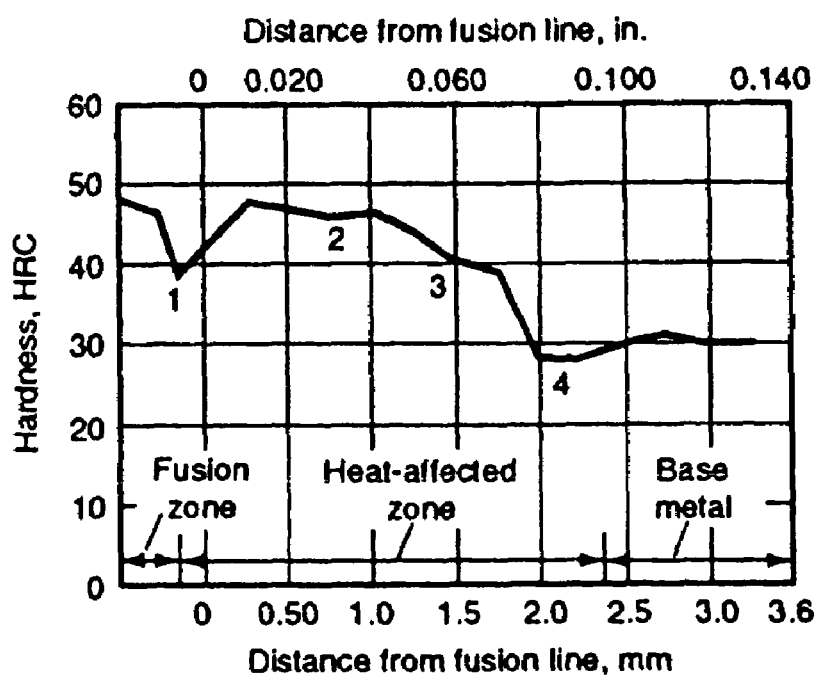
FIG. 2 is a plot of microhardness across a typical weld in an air-hardenable martensitic stainless steel with no pre- or post-heat treatment.
Figure 3:
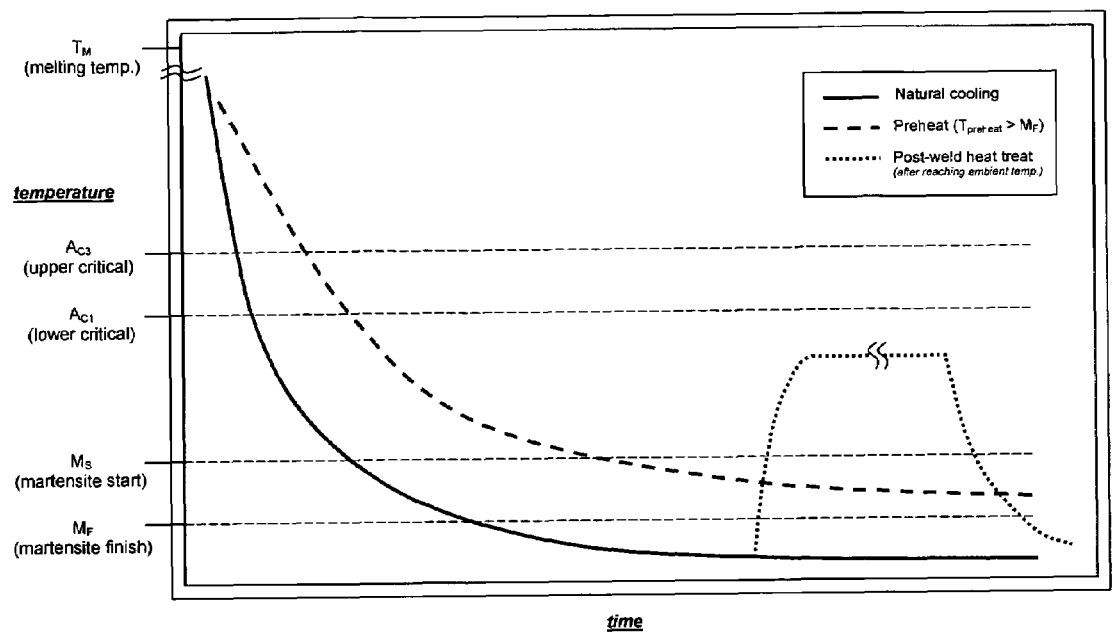
FIG. 3 is a plot illustrating conventional weld cooling rate profiles.

While the present invention is susceptible of embodiment in various forms, as shown in the drawings, hereinafter will be described the presently preferred embodiments of the invention with the understanding that the present disclosure is to be considered as an exemplification of the invention, and is not intended to limit the invention to specific embodiments illustrated.

The present invention includes methods of creating structures, tubes and tube-based structures from high strength steels and other hardenable alloys. The present invention is believed to have particular application to alloys, which upon seam welding, transform into martensitic weld and HAZ microstructures, and accordingly the following description has particular application to such steels. The process of the present invention allows for mechanical straining and deformation of the weld-zone, both the fusion zone and HAZ, immediately after welding, eliminating the need for additional processing steps such as a process annealing, subcritical annealing post-weld-heat-treatment or a solution heat treatment of the entire structure.

As outlined in the SAEJ412 specification, *GENERAL CHARACTERISTICS AND HEAT TREATMENTS OF STEELS*, "The HARDENABILITY or response to heat treatment is probably the most important single criterion for the selection of steel. Hardenability is that property of steels which determines the depth and distribution of hardness induced by quenching from above the transformation range . . . . The term hardening implies that the hardness of the material is increased by suitable treatment, usually involving heating to a suitable austenitizing temperature followed by cooling at a certain minimum rate which depends upon the alloy content. If quenching is complete, the resulting structure is martensite . . . its hardness depends upon carbon content of the steel."

As used herein, the term "hardenable alloys" refers to directly hardenable grades of steels and ferrous alloys that are responsive to a heat treatment. Additionally, hardenable alloys posses sufficient carbon content, in conjunction with other alloying elements, to form a martensitic microstructure in the fusion and HAZ after conventional seam welding. Hardenable alloys posses well defined transition temperatures, dependent on the particular chemical composition of the alloy: $A_{C3}$—upper critical temperature, $A_{C1}$—lower critical temperature, $M_S$—martensitic start temperature, and $M_F$—martensitic finish temperature. "Hardenable alloys" includes those steels and alloys that are considered air-hardenable, as the natural quench cooling rate associated with seam welding is greater than air quenching. As used herein, the term "hardenable alloys" does not include those steels and ferrous alloys who are considered "low carbon carburizing grades," which respond to heat treatment only through infusing elements into the material's surface via case hardening processes.

Representative hardenable alloys for which the present invention is applicable include, but are not limited to:

SAE 1030, 1034, 1035, 1037, 1038, 1039, 1040, 1042, 1043, 1044, 1045, 1046, 1049, 1050, 1053, 1536 (1036), 1541 (1041), 1547 (1047), 1547 (1047), 1548 (1048), 1551 (1051), 1552 (1052)

SAE 1055, 1059, 1060, 1064, 1065, 1069, 1070, 1074, 1075, 1078, 1080, 1084, 1085, 1086, 1090, 1095, 1561 (1061) 1566 (1066), 1572 (1072)

SAE 1330, 1335, 1340

SAE 4037, 4047, 4130, 4135, 4137, 4140, 4142, 4145, 4150, 4161, 4340

SAE 5046, 50B40, 50B44, 50B46, 50B50, 5060, 50B60,

SAE 5130, 5132, 5135, 5140, 5145, 5147, 5150, 5155, 51B60

SAE 6150

SAE 8630, 8637, 8640, 8642, 8645, 8650, 8655, 8660, 8740

SAE 81B45, 86B45, 94B30

SAE 9254, 9255, 9260

SAE 50100, 51100, 52100
SAE 51410, 51414, 51420, 51431, 51440A, 51440B, 51440C, 51501
22MnB5
30MnB5
DP600
DP800
DP1000

Figure 4:
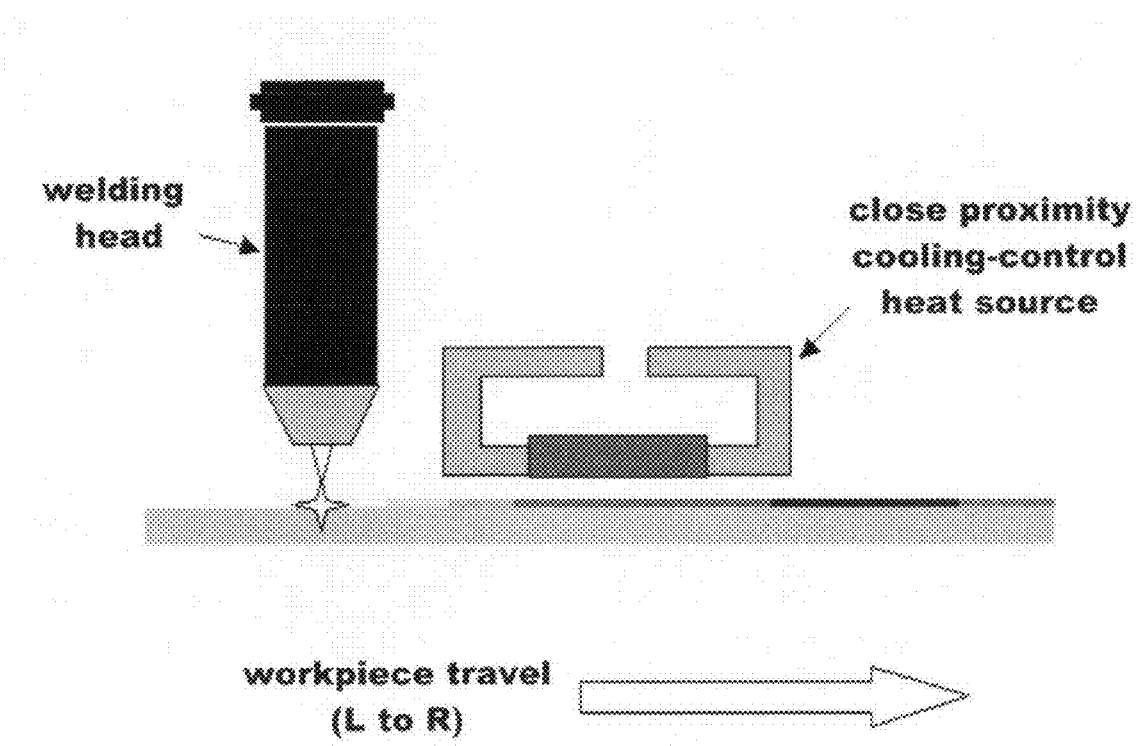
FIG. 4 is a block schematic of the invention: seam weld and cooling-control apparatus.

The preferred method of the present invention includes positively controlling the cooling rate, at a rate much slower than natural-air cooling, of the weld zone immediately following welding, such that the weld zone never becomes fully hardened. In addition to altering the hardness of the weld zone (i.e. reducing the amount of martensite present in the weld area microstructure), several other HAZ cracking contributors that the process mitigates include:

- Allowing additional time for hydrogen diffusion and release while the steel is in the highly hydrogen soluble face-centered-cubic (FCC) austenitic crystal structure, before being trapped in the body-centered-tetragonal (BCT) martensitic structure, which has low hydrogen solubility. This retained hydrogen, when subject to applied tensile stresses, is the cause of hydrogen induced cold-cracking in martensitic microstructures
- Reducing strains and stresses in the weld due to reduced thermal gradients along the length of the weld
- Increasing fusion zone and HAZ ductility and toughness
- Tempering any martensite in the weld which is formed prior to the controlled-cooling process The cooling rate control of the present invention consists of locally applying heat, with a secondary heat source, to the weld seam downstream of the weld area to prevent rapid heat loss. (FIG. 4) Heat is applied to the weld seam, using any of a variety of localized heat sources including, but not limited to, propane or oxyacetylene torches, resistance, electric arc, lasers, conductive, radiative, convective or high-frequency induction. The term "localized" is used herein to describe heat sources that provide heat to a localized area of a component, but do not heat the entire component, such as provided by a furnace or oven. In the case of continuous processes, such as in the production of seam welded pipe and tubing, selectively heating the localized weld seam area would be the most efficient embodiment for larger pipes. Alternatively, one would keep with the spirit of this invention by annularly heating the full circumference of the pipe, with a helical induction coil or other means, more appropriate for smaller pipe and tubing diameters. The secondary heat source is applied to the weld zone prior to the weld cooling to ambient temperature, before the material is allowed to fully transform into a martensitic microstructure, i.e. before the weld seam is allowed to cool to the martensite finish ($M_F$) temperature. (FIG. 5)

Figure 5:
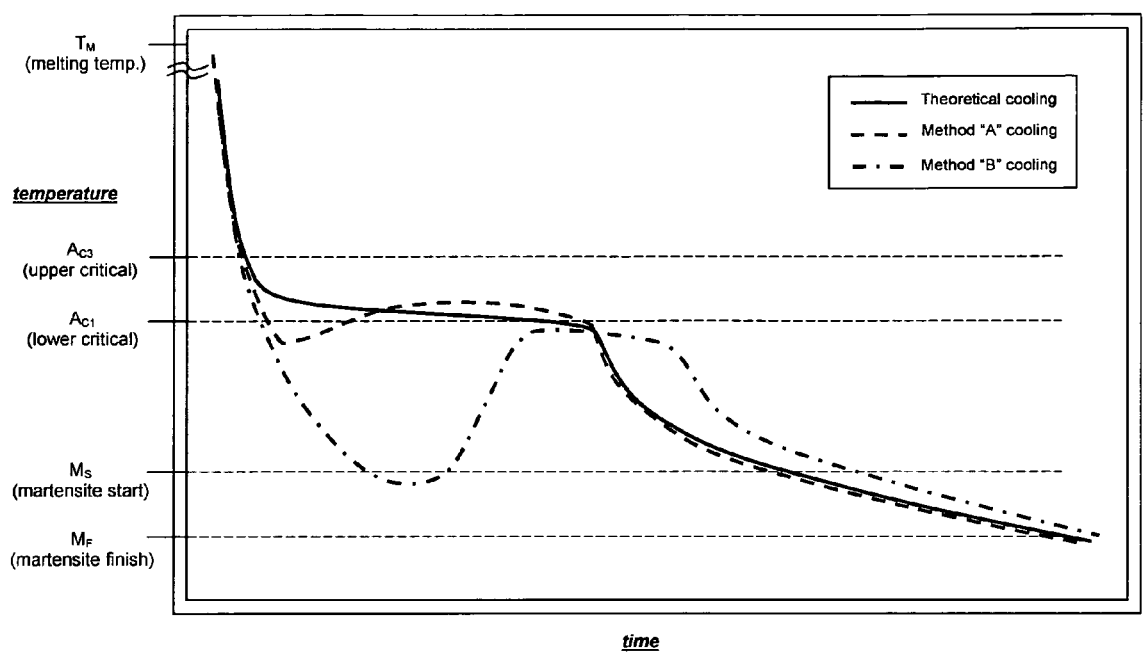
FIG. 5 is a plot illustrating Controlled-cooling weld cooling rate profiles of the invention.

As shown in FIG. 5, in a first embodiment depicted by "Method A", the temperature of the weld zone is allowed to drop approximately to the lower critical temperature ($A_{C1}$, eutectoid temperature), but the secondary heat source maintains the weld zone temperature above the martensitic start ($M_S$) temperature. Thereafter, the secondary heat source applies heat, maintained for a sufficiently long time period so as to reduce the hardness of the weld. Indeed the temperature of the weld zone may, or may not, rise once again above the $A_{C1}$ temperature, but may not rise above the upper critical temperature ($A_{C3}$). The cooling rate is held to a profile that prevents the weld zone from fully hardening and becoming brittle.

With continued reference to FIG. 5, in an alternative embodiment depicted by "Method B", the temperature of the weld zone is allowed to drop below the $A_{C1}$ temperature as well as below the martensitic start $M_S$ temperature. However, the secondary heat source maintains the weld zone temperature above the martensitic finish ($M_F$) temperature. Again, the secondary heat source applies heat at a sufficiently high temperature, maintained for a sufficiently long time period so as to reduce the hardness of the weld. The application of heat may, or may not, cause the temperature of the weld zone to rise once again above the $A_{C1}$ temperature but may not rise above the $A_{C3}$ temperature. Again, the cooling rate is held to a profile that prevents the weld zone from fully hardening and becoming brittle.

Figure 6:
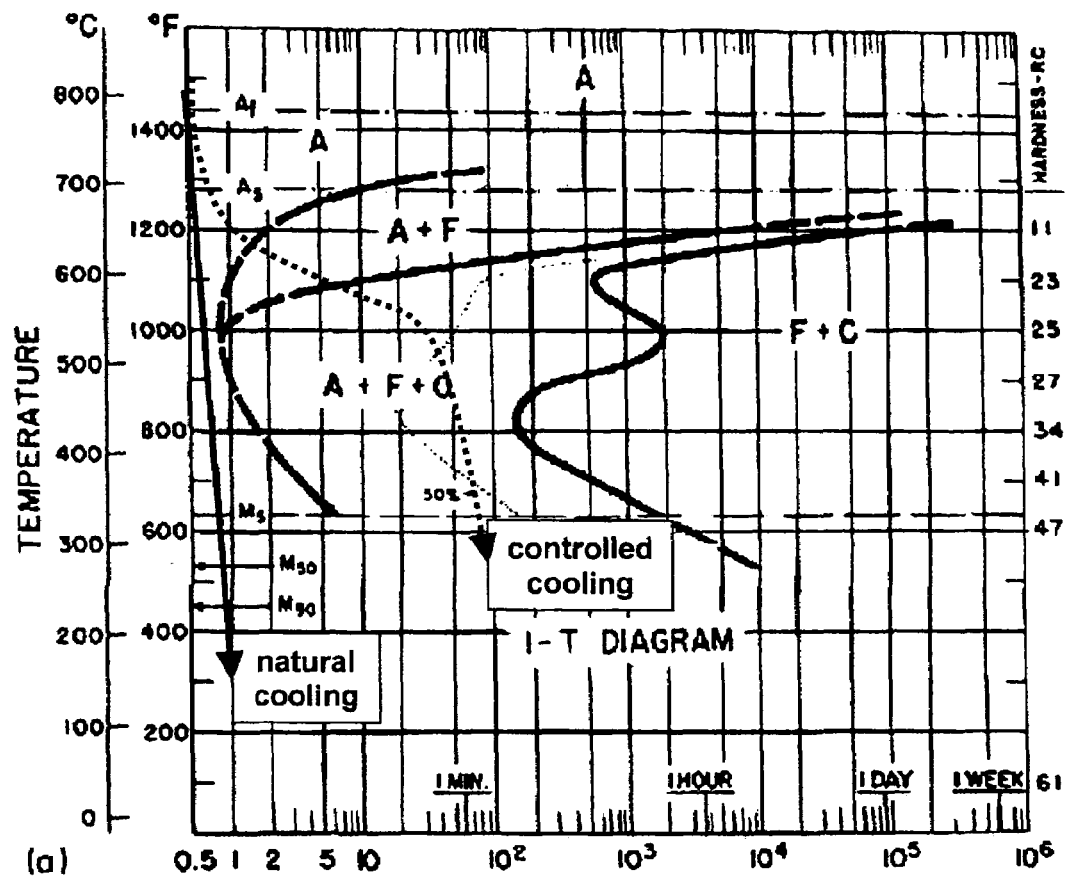
FIG. 6 is a Temperature Transformation (TTT) Diagram for a representative hardenable carbon-steel.
Figure 7:
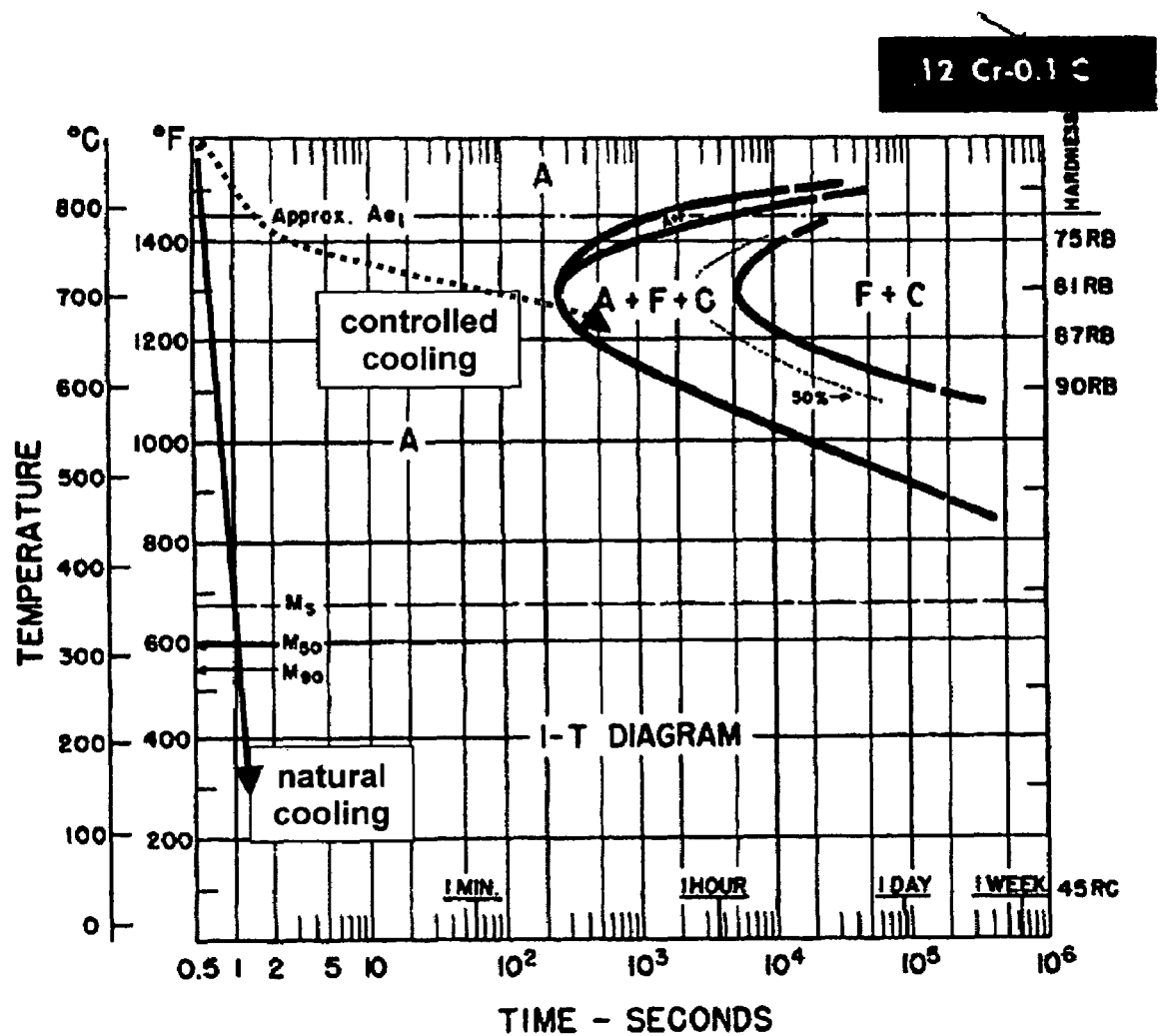
FIG. 7 is a Temperature Transformation (TTT) Diagram for a representative air-hardenable martensitic stainless steel.
Figure 8:
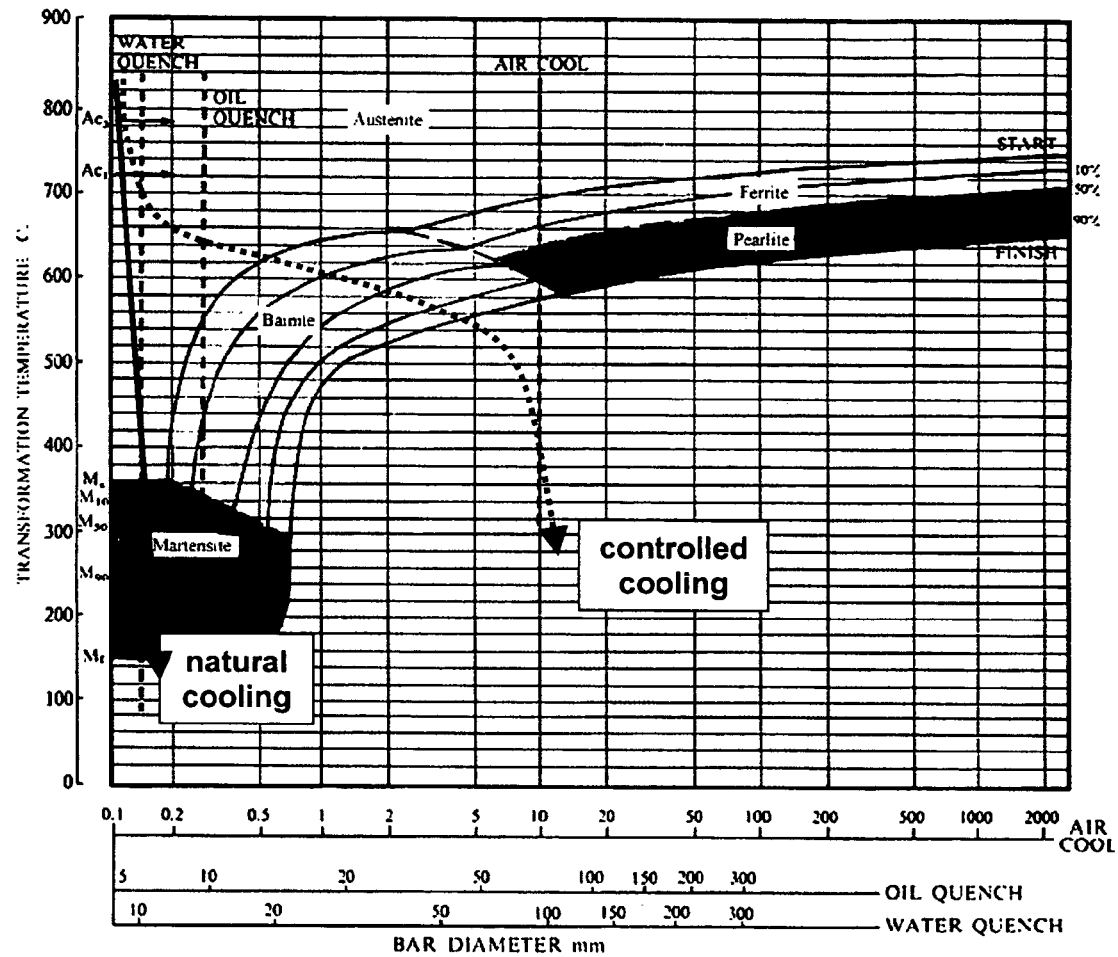
FIG. 8 is a Continuous Cooling Transformation (CCT) Diagram for a representative hardenable carbon-steel.

The invention is ideally suited for all seam-welding processes, such as laser welding, resistance seam welding, and arc welding (gas tungsten arc welding, gas metal arc welding, plasma arc welding). The cooling rate of the weld is positively controlled through the use of a secondary heat source. The weld area should be slow-cooled below the $A_{C3}$ and $A_{C1}$ temperatures at a rate much slower than natural-air cooling. As shown in FIGS. 6 & 7, the intent is to catch the "nose" of the time-temperature-transformation curve (TTT), thereby altering the final microstructure of the weld metal. FIG. 8, a continuous-cooling curve (CCT) shows the effect of reducing the cooling rate of weld with the secondary heat source, resulting in a bainitic microstructure in hardenable carbon steel. The shape of the TTT and CCT curves, the $A_{C3}$ temperature above which austenite is found, $A_{C1}$ temperature below which ferrite and carbide are stable, and the $M_s$ and $M_F$ temperatures are dependent on the alloy's chemical composition. The natural cooling rate is dependent upon weld speed, wall thickness, joint geometry, alloy type and ambient conditions. As such, the intensity of the secondary heat source will vary according to material type, joint design and welding parameters.

Figure 9:
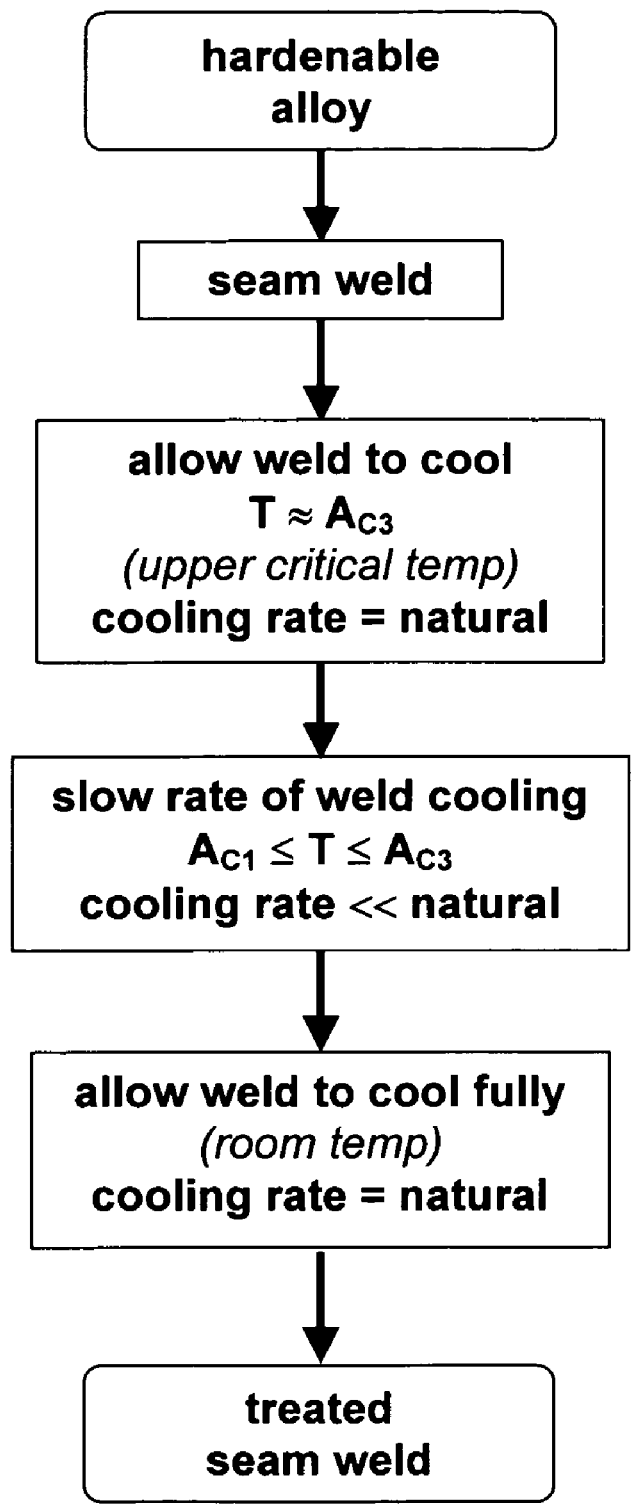
FIG. 9 is flow chart depicting the theoretical cooling-control heat treatment process of the present invention.

FIG. 9 depicts a flow chart of the idealized, or theoretical application, of the present invention. In reality, controlling the cooling rate accurately between the $A_{C3}$ and $A_{C1}$ temperatures is somewhat difficult, as the high rate of initial weld cooling (on the order of 1000° F./s on some geometries) necessitates a secondary heat source located immediately adjacent to the weld source. Additionally, with some air-hardenable alloys, the time needed to successfully control cooling and "catch the nose" of the TTT diagram can be over 100 seconds. However, this idealized process has merit with certain cases, such as thicker sections, slower welding speeds and certain hardenable alloys. Additionally, specially designed seam-welding and cooling control heads, complete with integrated secondary heat sources may allow for proper temperature control in the future.

Figure 10:
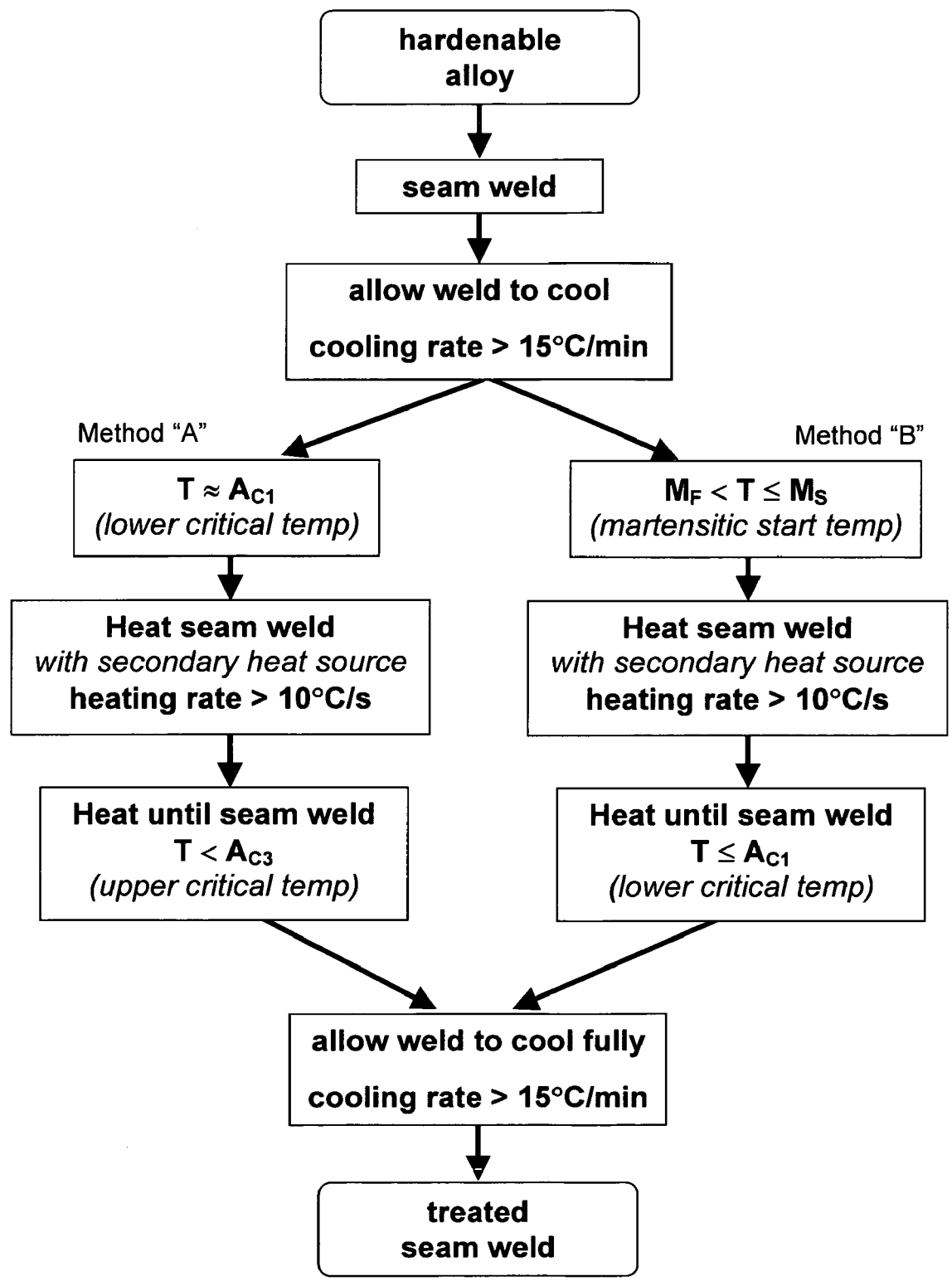
FIG. 10 is flow chart depicting two practical methods for carrying out the cooling-control heat treatment process of the present invention.

FIG. 10 depicts a flow chart of two practical embodiments of the present invention. Method "A", as described previously, attempts to mimic the cooling-control prescribed by the idealized application of the invention. The temperature of the seam weld is allowed to cool naturally to approximately the $A_{C1}$ temperature, and the secondary heat source is applied, modifying the cooling-rate of the weld. The temperature of seam weld may rise, but not to $A_{C3}$ temperature, while the secondary heat source is applied. The secondary heat source is maintained for a sufficiently long time period so as to reduce the hardness of the weld, after which, the weld is allowed to cool. Preferably, the seam weld is allowed to air-cool until 700-800° F., after which, it may be quenched in other media to ambient temperature. Method "B" is an alternative embodiment, wherein as described previously, the weld zone is allowed cool naturally to below the $A_{C1}$ and $M_S$ temperatures. However, the secondary heat source is applied before the seam weld cools to either the $M_F$ or ambient temperature, whichever is greater. Again, the secondary heat source applies heat at a sufficiently high temperature, maintained for a sufficiently long time period so as to reduce the hardness of the weld. The application of heat may, or may not, cause the temperature of the weld zone to rise once again above the $A_{C_1}$ temperature but may not rise above the $A_{C_3}$ temperature. The secondary heat source is maintained for a sufficiently long time period so as to reduce the hardness of the weld, after which, the weld is allowed to cool. Preferably, the seam weld is allowed to air-cool until 700-800° F., after which, it may be quenched in other media to ambient temperature.

It should be noted that Method "B" is not equivalent to conventional post-weld heat treatments in use by industry. There are several important distinctions which differentiates the present invention from well-known thermal treatments used in continuous seam-welding operations. For instance, it is well known in seam-welded tubing production to use "seam annealers" to improve the mechanical properties of the seam weld. These devices, designed to operate on non-hardenable alloys such as low-carbon steels and austenitic stainless steels, apply a secondary heat source on the seam weld downstream of the weld source. Three main distinctions apply: firstly, the "seam annealers" reheat the weld after it cools fully to ambient temperature; secondly, "seam annealers" reheat the weld to above the $A_{C_3}$ temperature, re-austenitizing the material and hold for some time then allowing to cool, equivalent to a "normalizing" heat treatment cycle; thirdly, "seam annealers" are employed on non-hardenable alloys. Examples of the "seam-annealing" process are described in U.S. Pat. Nos. 3,242,299, 4,975,128, and U.S. Patent Application No. 2002/0170639.

Figure 11:
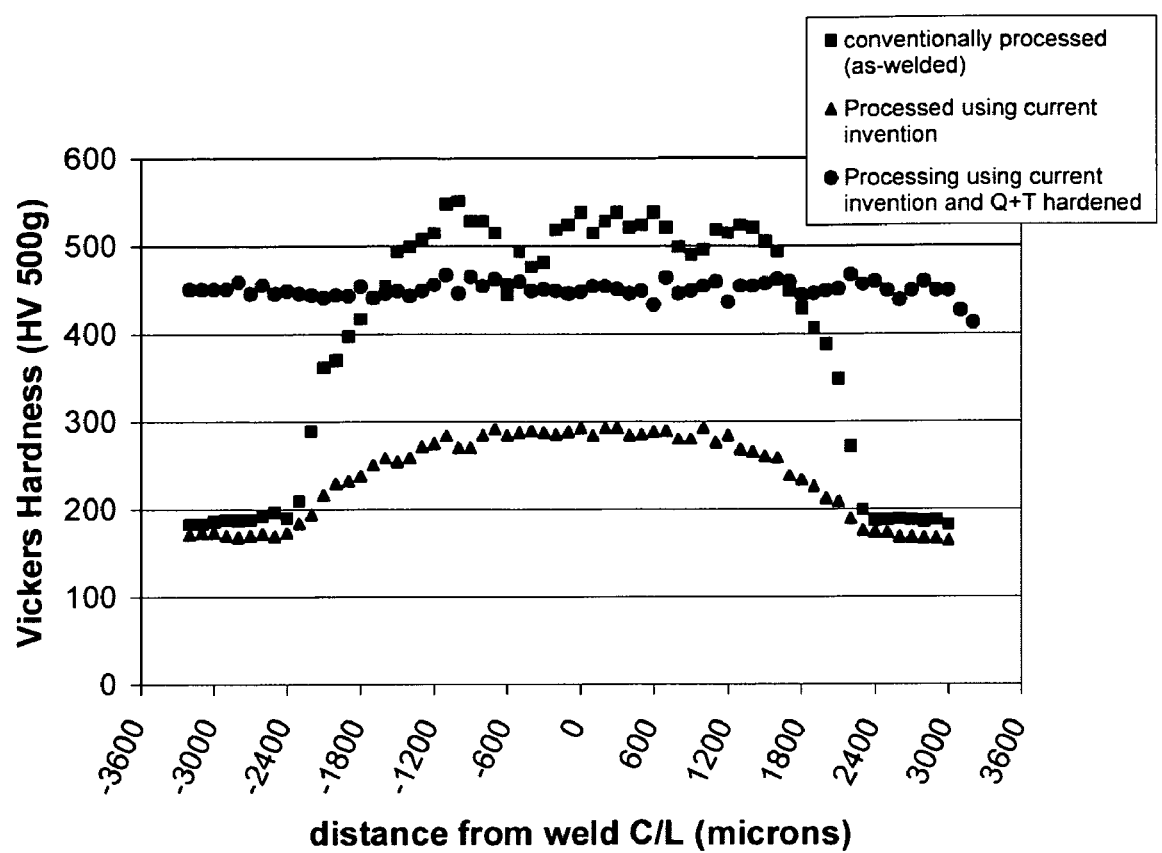
FIG. 11 is a plot of microhardness across the seam weld in air-hardenable martensitic stainless steel seam-welded tubing processed in accordance with the present invention.

In practice, initial test results with air hardenable martensitic stainless steels have found significant improvement in the mechanical properties of weld zones processed in accordance with the above described first and second embodiments when compared to as-welded (i.e. no controlled-cooling) specimens: both the first and second embodiments produced equal improvements in weld zone properties. (See FIG. 11). Tests were run with the present invention on a continuous seam-welded tube mill using type 410 stainless steel (UNS41000, SAE51410). Significant improvements were seen in the weld and HAZ microhardness by implementing the secondary heat source cooling-control process.

However, it is anticipated that the controlled cooling of the second embodiment will provide for weld zones having an increased tempered martensitic microstructure percentage since the weld zone drops briefly below the $M_S$ temperature. Where different alloys are processed, the application of the controlled cooling rates of these two embodiments may provide for different mechanical properties of weld zones and the selection of which controlled cooling rate will depend on the material used and mechanical properties desired.

While several particular forms of the invention have been illustrated and described, it will be apparent that various modifications can be made without departing from the spirit and scope of the invention. Therefore, it is not intended that the invention be limited except by the following claims. Having described my invention in such terms so as to enable persons skilled in the art to understand the invention, recreate the invention and practice it, and having identified the presently preferred embodiments thereof, we claim:

The invention claimed is:

1. A method of forming a steel structure comprising the steps of:

providing a first surface of a hardenable ferrous alloy having a carbon content equal or greater than 0.08% by weight;

providing a second surface of a hardenable ferrous alloy having a carbon content equal or greater than 0.08% by weight;

positioning said first surface adjacent to said second surface;

welding said first surface to said second surface by applying a first heat source to said first surface and said second surface at a sufficiently high temperature to said first surface and said second surface above their melting points to form a weld;

applying a second heat source to said weld immediately after said step of welding so as to be prior to said weld cooling below the martensitic finish temperature for said ferrous alloys, said second heat source being at a temperature lower than said first heat source but at a sufficiently high temperature and maintained for sufficient long time period so as to reduce the hardness of said weld; and subsequent to applying the second heat source to said weld, allowing said weld to cool to ambient temperature.

2. The method of forming a steel structure of claim 1 wherein said step of applying a second heat source to said weld immediately after said step of welding so as to be prior to said weld cooling below the martensitic finish temperature includes applying the second heat source to said weld subsequent to said weld cooling below the martensitic start temperature for said ferrous alloys.

3. The method of forming a steel structure of claim 2 wherein said step of applying a second heat source to said weld immediately after said step of welding so as to be prior to said weld cooling below the martensitic finish temperature but below the martensitic start temperature for said ferrous alloys does not include reheating said weld to above the lower critical temperature for said ferrous alloys.

4. The method of forming a steel structure of claim 1 wherein said step of applying a second heat source to said weld immediately after said step of welding so as to be prior to said weld cooling below the martensitic finish temperature includes applying the second heat source to said weld prior to said weld cooling below the martensitic start temperature for said ferrous alloys.

5. The method of forming a steel structure of claim 4 wherein said step of applying a second heat source to said weld immediately after said step of welding so as to be prior to said weld cooling below the lower critical temperature but above the martensitic start temperature for said ferrous alloys includes heating said weld to above the lower critical temperature but not above the upper critical temperature for said ferrous alloys.

6. The method of forming a steel structure of claim 4 wherein said step of applying a second heat source to said weld immediately after said step of welding so as to be prior to said weld cooling below the lower critical temperature but above the martensitic start temperature for said ferrous alloys does not include reheating said weld to above the lower critical temperature for said ferrous alloys.

7. The method of forming a steel structure of claim 1 wherein each of said ferrous alloys are martensitic stainless steels of type 410, 420 or 440.

8. The method of forming a steel structure of claim 1 further comprising roller forming the steel structure into a desired shape, said step of roller forming occurring after the steps of welding said first and second surfaces together and applying a second heat source to said weld.

9. The method of forming a steel structure of claim 8 wherein the steel structure is a tube and said first surface defines a first edge of a roll formed strip of a ferrous alloy and said second surface defines a second edge of the roll formed strip of ferrous alloy.

10. A method of forming a steel structure comprising the steps of:
providing a first surface of a hardenable ferrous alloy having a carbon content equal or greater than 0.08% by weight;
providing a second surface of a hardenable ferrous alloy having a carbon content equal or greater than 0.08% by weight;
positioning said first surface adjacent to said second surface;
welding said first surface to said second surface by applying a first heat source to said first surface and said second surface at a sufficiently high temperature to said first surface and said second surface above their melting points to form a weld;
applying a second heat source to said weld immediately after said step of welding so as to be prior to said weld cooling below the lower critical temperature but above the martensitic start temperature for said ferrous alloys, said second heat source being at a temperature lower than said first heat source but at a sufficiently high temperature and maintained for sufficient long time period so as to reduce the hardness of said weld; and
subsequent to applying the second heat source to said weld, allowing said weld to cool to ambient temperature.

11. The method of forming a steel structure of claim 10 wherein said step of applying a second heat source to said weld immediately after said step of welding so as to be prior to said weld cooling below the lower critical temperature but above the martensitic start temperature for said ferrous alloys includes heating said weld to above the lower critical temperature but not above the upper critical temperature for said ferrous alloys.

12. The method of forming a steel structure of claim 10 wherein said step of applying a second heat source to said weld immediately after said step of welding so as to be prior to said weld cooling below the lower critical temperature but above the martensitic start temperature for said ferrous alloys does not include heating said weld to above the lower critical temperature for said ferrous alloys.

13. The method of forming a steel structure of claim 10 wherein each of said ferrous alloys are martensitic stainless steels of type 410, 420 or 440.

14. The method of forming a steel structure of claim 10 further comprising roller forming the steel structure into a desired shape, said step of roller forming occurring after the steps of welding said first and second surfaces together and applying a second heat source to said weld.

15. The method of forming a steel structure of claim 14 wherein the steel structure is a tube and said first surface defines a first edge of a roll formed strip of a ferrous alloy and said second surface defines a second edge of the roll formed strip of ferrous alloy.

16. A method of forming a steel structure comprising the steps of:
providing a first surface of a hardenable ferrous alloy having a carbon content equal or greater than 0.08% by weight;
providing a second surface of a hardenable ferrous alloy having a carbon content equal or greater than 0.08% by weight;
positioning said first surface adjacent to said second surface;
welding said first surface to said second surface by applying a first heat source to said first surface and said second surface at a sufficiently high temperature to said first surface and said second surface above their melting points to form a weld;
applying a second heat source to said weld immediately after said step of welding so as to be prior to said weld cooling below the martensitic finish temperature for said ferrous alloys, said second heat source being at a temperature lower than said first heat source but at a sufficiently high temperature and maintained for sufficient long time period so as to bring the temperature of said weld to above the martensitic start temperature but below the lower critical temperature for said ferrous alloys so as to reduce the hardness of said weld; and
subsequent to applying the second heat source to said weld, allowing said weld to cool to ambient temperature.

17. The method of forming a steel structure of claim 16 wherein said ferrous alloy are air hardenable martensitic stainless steels.

18. The method of forming a steel structure of claim 16 wherein each of said ferrous alloys are martensitic stainless steels of type 410, 420 or 440.

19. The method of forming a steel structure of claim 16 further comprising roller forming the steel structure into a desired shape, said step of roller forming occurring after the steps of welding said first and second surfaces together and applying a second heat source to said weld.

20. The method of forming a steel structure of claim 19 wherein the steel structure is a tube and said first surface defines a first edge of a roll formed strip of a ferrous alloy and said second surface defines a second edge of the roll formed strip of ferrous alloy.

* * * * *